United States Patent [19]

Briley

[11] 4,393,518
[45] Jul. 12, 1983

[54] OPTICAL COMMUNICATION ARRANGEMENT

[75] Inventor: Bruce E. Briley, Countryside, Ill.

[73] Assignee: Bell Telephone Laboratories, Incorporated, Murray Hill, N.J.

[21] Appl. No.: 225,514

[22] Filed: Jan. 16, 1981

[51] Int. Cl.³ .............................................. H04B 9/00
[52] U.S. Cl. .................... 455/617; 455/610; 455/612; 455/613; 455/618
[58] Field of Search ............... 455/602, 603, 606, 607, 455/608, 610, 612, 613, 617, 618, 619

[56] References Cited

U.S. PATENT DOCUMENTS

| | | | |
|---|---|---|---|
| 3,456,129 | 7/1969 | Burnett et al. | 307/361 |
| 3,467,858 | 9/1969 | Burnett | 455/602 |
| 4,052,611 | 10/1977 | Fish | 455/608 |
| 4,054,834 | 10/1977 | Boirat et al. | 455/602 |

OTHER PUBLICATIONS

Straus et al.—Analog Modulation of Optical Fiber Systems—Conf. 1978 National Telecommunications—vol. 1, pp. 13.4.1-13.4.5-Dec. 3-6, 1978.
Chang, Keith Y., "Fiberguide Systems in the Subscriber Loop," Proceedings of the IEEE, vol. 68, No. 10, Oct. 1980.

Primary Examiner—Joseph A. Orsino, Jr.
Attorney, Agent, or Firm—P. Visserman; R. J. Godlewski

[57] ABSTRACT

An optical transmission arrangement includes a transmitter which transmits an electrical analog input signal as two separate optical signals through a pair of optical fibers to a receiver. Combining the two optical signals, the receiver generates an electrical analog output signal representative of the input signal, absent even harmonic frequency components which may have been introduced in transmission.

9 Claims, 2 Drawing Figures

OPTICAL COMMUNICATION ARRANGEMENT

TECHNICAL FIELD

This invention relates generally to optical communication systems and, more particularly, to an optical transmission arrangement for the transmission of analog signals.

BACKGROUND OF THE INVENTION

A typical optical communication system will include an optical source such as, for example, a light-emitting diode for converting an electrical input signal to an optical signal, a photodetector for converting the optical signal to an electrical output signal, and an optical fiber waveguide for guiding the optical signal from the optical source to the photodetector. In optical fiber communication systems, the maximum transmission distance is limited by fiber attenuation and fiber dispersion. When analog signals are used, the maximum transmission distance is further limited by optical source nonlinearities which introduce harmonic distortions and limit the amount of power that may be used without severe distortion of the transmitted analog signal. Optical source nonlinearities, however, are not a serious problem in the transmission of digital signals. Consequently, a great deal of attention has been focused on the development of digital transmission systems even though analog signals generally have a smaller signal bandwidth than digital signals. Since the bandwidth of optical fiber is large and the bandwidth of a digital voice signal is relatively small, a large number of digital voice channels may be transmitted through a single optical fiber. Even though the bandwidth of an analog voice channel is somewhat less than that of a digital voice channel, source nonlinearities do not allow as large a number of analog voice channels to be transmitted through a single fiber. For other applications, the difference between analog and digital bandwidth is much more dramatic. For example, the bandwidth of a digital video channel is typically 15 times larger than an analog video channel. Thus, it would be advantageous to transmit a voice or video and the like as analog rather than as digital signals if harmonic distortion could be significantly reduced or even eliminated.

Several compensation schemes to improve the linearity of the optical source and to reduce harmonic distortion are known. These schemes include complementary distortion, negative feedback, phase shift modulation, feedforward, and quasi-feedforward compensation. Complementary distortion cancels harmonic distortion by introducing additional distortion into the drive circuit of each source to compensate for the harmonic distortion. The problem with this scheme is that each drive circuit must be individually designed to match the distortion of the optical source. In the negative feedback scheme, a portion of the optical signal is used to provide a compensating feedback signal, but here transmission bandwidth, frequency range, and transmitted power are reduced. Phase shift modulation produces selective harmonic compensation of nonlinearities in pairs of optical sources having similar characteristics, but the available transmission bandwidth is again reduced. Feedforward compensation involves the generation of an error signal by comparing a portion of the main optical signal to the input signal. Responding to the error signal, a second optical source produces another optical signal which is combined with the main optical signal to generate a linearized output signal. As with the negative feedback scheme, the amount of transmitted power is reduced. Quasi-feedforward compensation schemes combine elements of the feedforward and complementary distortion schemes, but also suffer from a reduction in transmitted power. Each of these complex compensation schemes does reduce harmonic distortion in varying degrees, but most suffer from a reduction in transmission bandwidth, frequency range, or transmitted power.

SUMMARY OF THE INVENTION

An optical transmission arrangement in accordance with this invention reduces harmonic distortion by means of a transmitter which transmits an electrical analog input signal as two separate optical signals over an optical waveguide to a receiver which combines the two optical signals to generate an electrical analog output signal absent particular harmonic frequency components, for example, even harmonics which may have been introduced in transmission. In one illustrative embodiment of the invention, the transmitter includes a generator for generating two excitation signals and two light-emitting diodes for converting the excitation signals to the two optical signals. One optical signal represents the positive portions of the input signal, the other represents the negative portions of the input signal. The receiver includes two photodetectors for converting the optical signals to two response signals and a difference amplifier for subtractively combining the response signals into an output signal representative of the input signal, absent even harmonic frequency components which may have been introduced in transmission.

Advantageously, the optical transmission arrangement in accordance with this invention provides an inexpensive and uncomplicated optical transmission arrangement without a reduction in transmission bandwidth, frequency range, and transmitted power as in prior art schemes.

BRIEF DESCRIPTION OF THE DRAWING

The invention may be better understood from the following detailed description when read with reference to the drawing in which.

DETAILED DESCRIPTION

Figure 1:
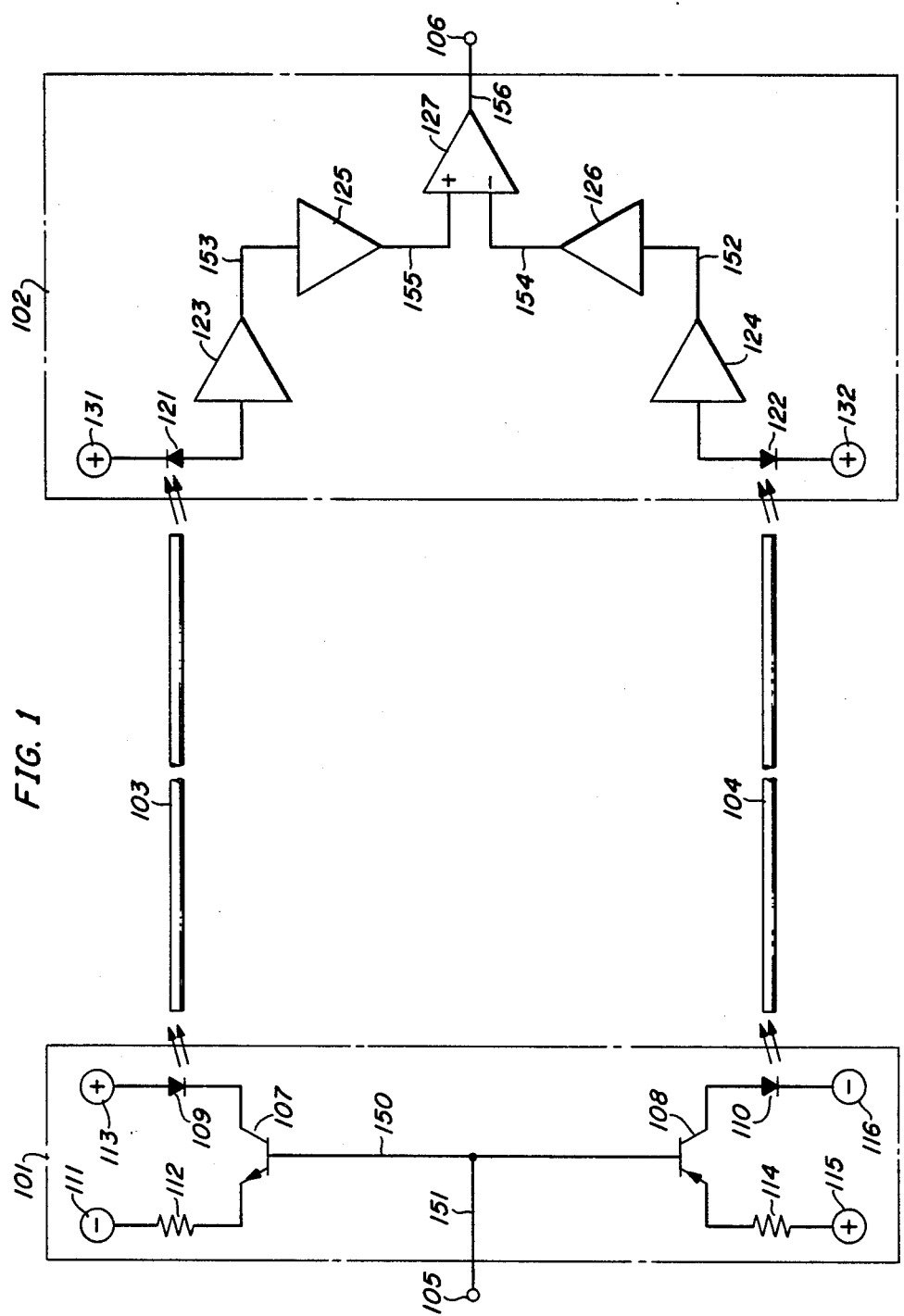
FIG. 1 represents an illustrative embodiment of an optical transmission arrangement in accordance with this invention.

FIG. 1 depicts an illustrative optical transmission arrangement as including a transmitter 101 coupled through two optical fibers 103 and 104 to a receiver 102. An electrical analog input signal having a positive and a negative portion, for example a sinusoidal signal, may be applied to input terminal 105 of transmitter 101. In response, transmitter 101 transmits two analog optical signals through optical fibers 103 and 104 to receiver 102. The first optical signal represents the positive portion of the input signal; the second, the inverse of the negative portion. Subtracting the second from the first optical signal, receiver 102 generates on output terminal 106 an electrical analog output signal representative of the input signal, absent even harmonic frequency components which may have been introduced in transmission.

Figure 2:
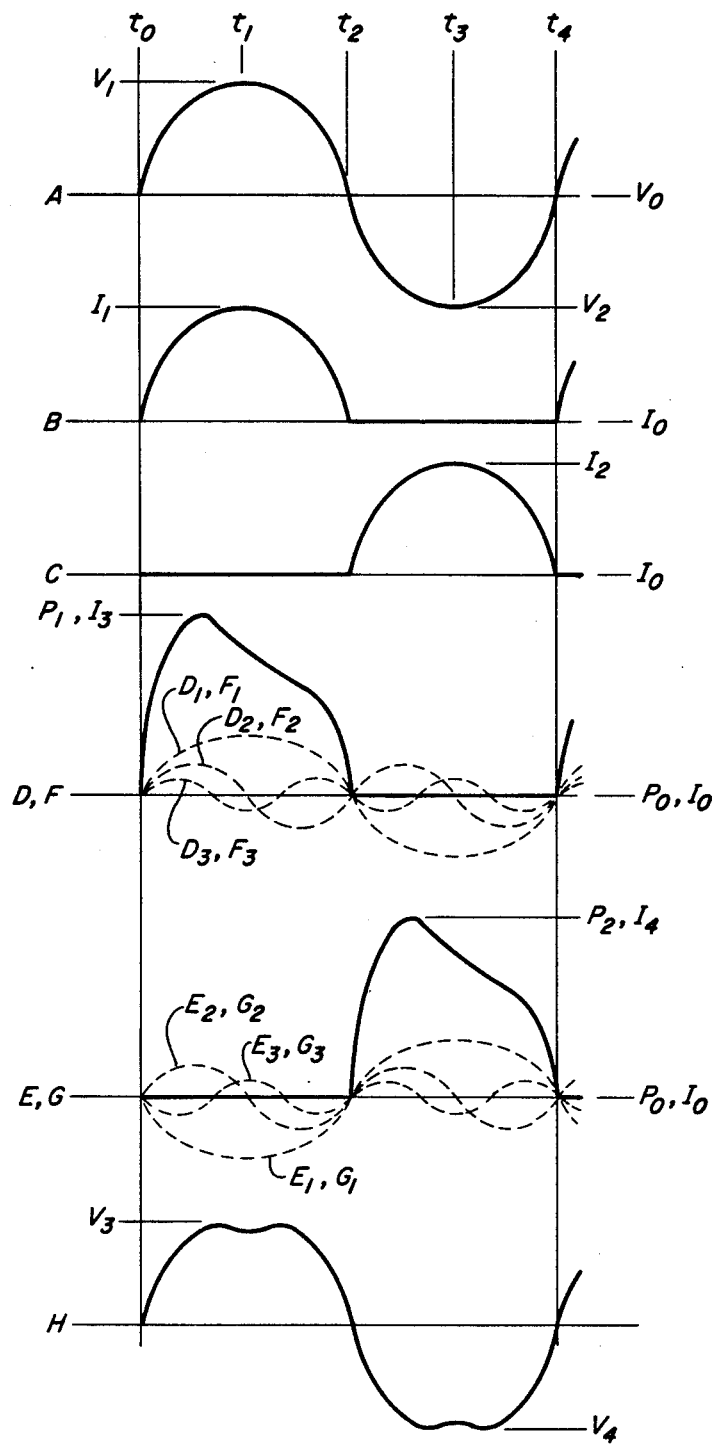
FIG. 2 is a diagram of idealized signals, plotted with respect to time, depicting graphically certain of the operations of the arrangement of FIG. 1.

The operation of the arrangement of FIG. 1 may be better understood with reference to the timing diagram of FIG. 2. Adjacent to designation A in FIG. 2, from time $t_0$ to $t_4$, is a graphical representation of one cycle of an idealized sinusoidal input signal A. Times $t_0$ through $t_3$ mark the beginning of successive quarter cycles. It is well known that by a Fourier analysis, any signal may be represented by a constant level signal plus a number of harmonic sinusoidal signals. Thus, a description of the operation of this illustrative optical transmission arrangement in response to sinusoidal input signal A, will suffice for an understanding of the invention in response to any signal format. By way of example, input signal A may have a frequency of 5 megahertz and a time period of 200 nanoseconds from time $t_0$ to $t_4$. At times $t_0$, $t_2$, and $t_4$, input signal A is at zero reference voltage level $V_0$. In addition, input signal A reaches maximum voltage level $V_1$, which may be, for example, $+2$ volts, at time $t_1$ and minimum voltage level $V_2$, which may be, for example, $-2$ volts, at time $t_3$. The positive portion of input signal A is above zero reference voltage level $V_0$ and occurs during the first half of the cycle between times $t_0$ and $t_2$. The negative portion of input signal A is below zero reference voltage level $V_0$ and occurs during the last half of the cycle between times $t_2$ and $t_4$.

At time $t_0$, input signal A is applied to input terminal 105 of transmitter 101. Transmitter 101 includes a generator, having a matched pair of base-connected NPN and PNP transistors 107 and 108, for generating two analog excitation signals B and C and two matched light-emitting diodes (LEDs) 109 and 110 for converting excitation signals B and C to optical signals D and E, respectively. The bases of NPN and PNP transistors 107 and 108 are connected by conductor 150, which in turn is connected to input terminal 105 via conductor 151. With input signal A applied to terminal 105, NPN transistor 107 generates excitation signal B in the form of current flowing through LED 109, and PNP transistor 108 generates excitation signal C in the form of current flowing through LED 110. A graphical representation of one cycle of idealized excitation signals B and C is depicted in FIG. 2, adjacent to the designations B and C, respectively.

When input signal A is in the positive portion, during the first half of the cycle, NPN transistor 107 is in the conducting state, and PNP transistor 108 in the cutoff state. The emitter of NPN transistor 107 is connected to negative potential source 111 through current limiting resistor 112; the collector is connected to positive potential source 113 through LED 109. Thus, during the positive portion of input signal A, current flows through LED 109 and its amplitude is linearly dependent on the level of input signal A. Clearly, the amplitude of this current also depends on the voltage levels of positive and negative potential sources 113 and 111 and on the value of current limiting resistor 112. By way of example, positive and negative potential sources 113 and 111 may be $+10$ and $-0.6$ volts, respectively. As depicted in FIG. 2, starting at zero reference current level $I_0$ at time $t_0$, the current through LED 109 sinusoidally reaches maximum current level $I_1$, which may be, for example, 100 ma., at time $t_1$. Thus, excitation signal B represents the positive portion of input signal A. When PNP transistor 108 is in the cutoff state, during the positive portion of signal A, little, if any, current flows through LED 110, and excitation signal C is maintained at zero reference current level $I_0$.

When input signal A is in the negative portion, during the last half of the cycle, NPN transistor 107 is in the cutoff state, and PNP transistor 108 is in the conducting state. The collector of PNP transistor 108 is connected through LED 110 to negative potential source 116, which may be, for example, $-10$ volts; the base is connected through current limiting resistor 114 to positive potential source 115, which may be, for example, $+0.6$ volts. Thus, during the negative portion of signal A, current flows through LED 110, and its amplitude is linearly dependent on the level of input signal A. Starting at zero reference current level $I_0$ at time $t_2$, shown in FIG. 2, the current through LED 110 sinusoidally reaches maximum current level $I_2$, which may be, for example, 100 ma., at time $t_3$. Hence, excitation signal C represents the inverse of the negative portion of input signal A. When NPN transistor 107 is in the cutoff state, during the negative portion of signal A, little, if any, current flows through LED 109, and excitation signal B is maintained at zero reference current level $I_0$.

With excitation signal B applied, LED 109 launches optical signal D into optical fiber 103 for guidance to receiver 102. Likewise, with excitation signal C applied, LED 110 launches optical signal E into optical fiber 104. Matched optical fibers 103 and 104, which may be, for example, several kilometers in length, are coupled using any suitable coupling or mounting means, to the light-emitting portion of LEDs 109 and 110, respectively. A graphical representation of one cycle of idealized optical signals D and E, is depicted by the solid lines in FIG. 2, adjacent to the designations D, F and E, G, respectively. These waveforms are typical of the light power that may be produced by standard LEDs in response to rectified sinusoidal signals such as B and C. Because of the nonlinearities of standard LEDs such as 109 and 110, optical signals D and E contain harmonic frequency components and, thus, are harmonicly distorted. During the first half of the cycle when LED 109 is conducting current, optical signal D represents the positive portion of input signal A. When LED 110 is conducting current during the last half of the cycle, optical signal E represents the inverse of the negative portion of input signal A. Even though LEDs 109 and 110 introduce the greatest amount of harmonic distortion into optical signals D and E, transistors 109 and 110, as well as other components of the arrangement, may also contribute to the distortion.

Using a Fourier analysis, optical signal D may be represented by a constant level signal plus a number of harmonic sinusoidal signals. A graphical representation of one cycle of idealized first through third order Fourier harmonic signals $D_1$ through $D_3$, which represent the first through third order Fourier harmonic frequency components of optical signal D, are depicted by the dotted lines in FIG. 2, adjacent to the designations $D_1$ through $D_3$, respectively. Optical signal D may also be represented by additional higher order Fourier harmonic frequency components plus a constant level component, although only Fourier harmonic signals $D_1$ through $D_3$ need be considered for an understanding of the invention. Fourier harmonic signals $D_1$ through $D_3$ represent not only signal D produced by LED 109 in response to excitation signal B during the first half of the cycle, but also during the last half of the cycle when LED 109 launches little, if any, light power. From zero reference power level $P_0$ at time $t_0$, optical signal D reaches peak light power level $P_1$, which may be, for example, 100 microwatts, during the first half of the cycle. During the last half of the cycle, optical signal D maintains zero reference power level $P_0$. In like fashion, optical signal E may be represented by first through third order Fourier harmonic signal $E_1$ through $E_3$. Fourier harmonic signals $E_1$ through $E_3$ are depicted by the dotted lines in FIG. 2, adjacent to the designations $E_1$ through $E_3$, respectively. Optical signal E is maintained at zero power reference level $P_0$, during the first half of the cycle, and reaches peak light power level $P_2$, which may be, for example, 100 microwatts, during the last half of the cycle.

Subtractively combining optical signals D and E, receiver 102 generates electrical analog output signal H. A graphical representation of one cycle of an idealized output signal H, which is the voltage on output terminal 106 of receiver 102, is depicted in FIG. 2, adjacent to the designation H. Output signal H represents input signal A absent even harmonic frequency components introduced by LEDs 109 and 110. Receiver 102 includes a matched pair of photodiodes 121 and 122, amplifiers 123 through 126, and a difference amplifier 127 for generating output signal H. The light sensitive portion of photodiodes 121 and 122 are coupled, using any suitable coupling or mounting means, to optical fibers 103 and 104, respectively. Photodiode 121 converts optical signal D to an electrical response signal F, which is the current flowing through reversed-biased photodiode 121. The waveform of the electrical response signal produced by a standard photodiode, such as photodiode 121 or 122, will be substantially identical to the waveform of the optical signal. A graphical representation of one cycle of an idealized current response signal F is depicted by the same solid line as signal D adjacent to the designation D, F in FIG. 2. The amplitude of this current depends on several factors, including: the power level of received optical signal D, which may reach, for example, 5 microwatts; the level of positive potential source 131, which may be, for example, 30 volts; and the input impedance of transimpedance amplifier 123. During the first half of the cycle, current flows from positive potential source 131 through photodiode 121 to transimpedance amplifier 123 and reaches a maximum current level $I_3$, which may be, for example, 2 microamperes. During the last half of the cycle, response signal F is maintained at zero reference current level $I_0$. Even though response signal F is depicted as being identical to optical signal D, additional harmonic distortion, not shown in the drawing, may be introduced by the nonlinearities of photodiode 121. Response signal F may be represented by first through third order Fourier harmonic frequency components $F_1$ through $F_3$, which are depicted in FIG. 2, adjacent to designations $F_1$ through $F_3$, respectively, and identical to Fourier harmonic signals $D_1$ through $D_3$.

Photodiode 122 converts optical signal E to an electrical response signal G, which is the current flowing through photodiode 122. Response signal G is depicted by the solid line in FIG. 2, adjacent to the designation E, G, and is assumed to be identical to optical signal E, for the reasons stated in the previous paragraph. During the first half of the cycle, response signal G is maintained at zero reference current level $I_0$. During the last half of the cycle, response signal G current flows from positive potential source 132, which may be, for example, 30 volts, through reverse-biased photodiode 122 to the input terminal of transimpedance amplifier 124 and reaches a maximum current level $I_4$, which may be, for example, 2 microamperes. Response signal G may be represented by first through third order Fourier harmonic frequency components $G_1$ through $G_3$, which are depicted, adjacent to the designations $G_1$ through $G_3$, respectively, and identical to Fourier harmonic signals $E_1$ through $E_3$.

Response signal F is converted by transimpedance amplifier 123 from a low level current to a low level voltage, which is amplified by operational amplifier 125 and applied to the plus input terminal of difference amplifier 127. Response signal G is likewise converted by transimpedance amplifier 124, amplified by operational amplifier 126, and applied to the minus input terminal of difference amplifier 127. Difference amplifier 127, in response to response signals F and G, generates output signal H on output terminal 106. The output terminal of transimpedance amplifier 123 is connected via conductor 153 to the input terminal of operational amplifier 125, the output terminal thereof being connected via conductor 155 to the plus input terminal of difference amplifier 127. Likewise, the output terminal of transimpedance amplifier 124 is connected via conductor 152 to the input terminal of operational amplifier 126, the output terminal thereof being connected via conductor 154 to the minus input terminal of difference amplifier 127. The output terminal of difference amplifier 127 is connected to output terminal 106 via conductor 156. Transimpedance, operational, and difference amplifiers are all well known in the art as linear devices whose output signals are linearly proportional to the input signals within specified amplification ranges. By way of example, the amplifiers may be selected such that the maximum level of the voltage applied to the plus and minus input terminals of difference amplifier 127 may reach plus 2 volts.

Subtracting response signal G from signal F, difference amplifier 127 generates output signal H representative of input signal A, absent even harmonic frequency components introduced by the transmission arrangement, primarily by matched LEDs 109 and 110. As may be shown mathematically, output signal H is comprised of amplified first through third order Fourier harmonic frequency components $F_1$ through $F_3$ minus the amplified first through third order Fourier harmonic frequency components $G_1$ through $G_3$. As a result, the even order Fourier harmonic frequency components $F_2$ and $G_2$ cancel one another. FIG. 2 shows a representation of output signal H, adjacent to the designation H. Signal H resembles sinusoidal signal A except for minor abnormalities at the peaks. These minor abnormalities are primarily due to only the odd order harmonic frequency components introduced by LEDs 109 and 110. The even order harmonic frequency components introduced by LEDs 109 and 110 are canceled in the combination of response signals G and F by difference amplifier 127. By way of example, output signal H may reach maximum and minimum voltage levels $V_3$ and $V_4$ of plus and minus 2 volts, respectively.

It will be appreciated that if only one optical fiber is desired for the transmission of optical signals D and E, LEDs 109 and 110 may be selected to emit light of different wavelengths. Having different wavelengths, optical signals D and E may be Y-coupled to the receiving end of a single optical fiber, in a well-known manner, for transmission to photodiodes 121 and 122, which are Y-coupled to the transmitting end of the optical fiber. Likewise, photodiodes 121 and 122 would each be selected to be responsive to only one of the two different wavelengths of LEDs 109 and 110. It will be further appreciated that LEDs 109 and 110, as well as photodiodes 121 and 122, may be arranged in one capsule, thereby eliminating the need for a Y-coupler at each end of the optical fiber.

Accordingly, what has been described is only one specific illustrative arrangement according to this invention, and it is to be understood that various and numerous other arrangements may be devised by one skilled in the art without departing from the spirit and scope of the invention as limited only by the accompanying claims.

What is claimed is:

1. An optical transmission arrangement adapted to compensate for harmonic frequency distortion, comprising:

transmitter means responsive to an electrical analog input signal having a positive and a negative portion for generating first and second analog optical signals each having harmonic frequency components equivalent to those of the other of said optical signals and representative of said positive and negative portions, respectively;

receiver means; and optical waveguide means for guiding said first and second optical signals from said transmitter means to said receiver means;

said receiver means for combining said first and second optical signals and canceling certain of said equivalent harmonic frequency components to generate an electrical analog output signal representative of said input signal and having harmonic frequency components representative of only particular ones of said harmonic frequency components of said optical signals.

2. An optical transmission arrangement in accordance with claim 1, in which said transmitter means comprises:

generator means responsive to said input signal for generating first and second analog excitation signals representative of said positive and said negative portions, respectively;

first light-emitting means having specified electrical and optical characteristics for converting said first excitation signal to said first optical signal; and second light-emitting means having electrical and optical characteristics equivalent to said specified characteristics of said first light-emitting means for converting said second excitation signal to said second optical signal.

3. An optical transmission arrangement in accordance with claim 1 or claim 2, in which said optical waveguide means comprises first and second optical fiber means coupled between said transmitter and said receiver means for guiding said first and said second optical signals, respectively.

4. An optical transmission arrangement adapted to compensate for harmonic frequency distortion, comprising:

generator means responsive to an electrical analog input signal having a positive and a negative portion for generating first and second analog excitation signals representative of said positive and negative portions, respectively;

first light-emitting means having specified electrical and optical characteristics for converting said first excitation signal to a first optical signal having harmonic frequency components;

second light-emitting means having electrical and optical characteristics equivalent to said specified characteristics of first light-emitting means for converting said second excitation signal to a second optical signal having harmonic frequency components equivalent to said components of said first optical signal;

first photodetector means for converting said first optical signal to a first response signal;

second photodetector means for converting said second optical signal to a second response signal;

optical waveguide means for guiding said first and second optical signals from said light-emitting means to said photodetector means; and combining circuit means for combining said first and second response signals to generate an electrical analog output signal representative of said input signal and having harmonic frequency components representative of only particular ones of said harmonic frequency components of said optical signals.

5. An optical transmission arrangement in accordance with claim 4 in which said combining circuit means comprises difference amplifier means for subtractively combining said first and second response signals to generate said output signal representative of said input signal and having harmonic frequency components representative of only odd numbered ones of said harmonic frequency components of said optical signals.

6. An optical transmission arrangement in accordance with claim 4 or claim 5, in which said optical waveguide means comprises:

first optical fiber means coupled between said first light-emitting means and said first photodetector means for guiding said first optical signal; and second optical fiber means coupled between said second light-emitting means and said second photodetector means for guiding said second optical signal.

7. An optical transmission arrangement in accordance with claim 6, in which said generator means comprises:

first amplifier means responsive to said positive portion for generating said first excitation signal; and second amplifier means responsive to said negative portion for generating said second excitation signal.

8. An optical transmission arrangement in accordance with claim 7 in which said arrangement further comprises third amplifier means connected to said first photodetector means and said combining circuit means and fourth amplifier means connected to said second photodetector means and said combining circuit means for amplifying said first and said second response signals, respectively.

9. An optical transmission arrangement adapted to compensate for harmonic frequency distortion, comprising:

a matched pair of transistor devices responsive to an electrical analog input signal having positive and negative portions for generating first and second excitation signals representative of said positive and negative portions, respectively;

a matched pair of light-emitting diodes having equivalent electrical and optical characteristics and each connected to one of said transistor devices for converting said first and second excitation signals to first and second optical signals each having harmonic frequency components equivalent to those of the other of said optical signals, respectively;

a matched pair of photodiodes for converting said first and second optical signals to first and second response signals, respectively;

a matched pair of optical fibers each optically-coupling one of said light-emitting diodes to one of said photodiodes; and a difference amplifier connected to said photodiodes and responsive to said first and second response signals for generating an output signal representative of said input signal and having harmonic frequency components representative of only odd numbered ones of said harmonic frequency components of said optical signals.

* * * * *